US007213263B2

(12) United States Patent
Makineni et al.

(10) Patent No.: US 7,213,263 B2
(45) Date of Patent: May 1, 2007

(54) SYSTEM AND METHOD FOR SECURE NETWORK MOBILITY

(75) Inventors: Gowri Makineni, Alexandria, VA (US); Ravi Nagarajan, Fairfax, VA (US); Qiang Zhang, Falls Church, VA (US); Hari Gadi, Fairfax, VA (US); Dzung Tran, Ashburn, VA (US)

(73) Assignee: Smith Micro Software, Inc., Herndon, VA (US)

( * ) Notice: Subject to any disclaimer, the term of this patent is extended or adjusted under 35 U.S.C. 154(b) by 941 days.

(21) Appl. No.: 09/987,168

(22) Filed: Nov. 13, 2001

(65) Prior Publication Data

US 2002/0066036 A1 May 30, 2002

Related U.S. Application Data

(60) Provisional application No. 60/247,008, filed on Nov. 13, 2000.

(51) Int. Cl.
*G06F 17/00* (2006.01)
(52) U.S. Cl. .............................. 726/11; 726/13; 726/15; 726/12
(58) Field of Classification Search .................. 726/11, 726/12, 15, 13
See application file for complete search history.

(56) References Cited

U.S. PATENT DOCUMENTS 6,061,650 A 5/2000 Malkin et al.

OTHER PUBLICATIONS http://java.sun.com/sfaq/chronology.html.*
http://java.sun.com/sfaq.*
http://java.sun.com/developer/technicalArticles/Security/applets.*

Cozilet: transparent encapsulation to prevent abuse of trusted applets Kojima, H.; Morikawa, I.; Nakayama, Y.; Yamaoka, Y.; Computer Security Applications Conference, 2004. 20th Annual Dec. 6-10, 2004 pp. 146-155.*
Migration of Internet security protocols to the IPSEC framework Sierra, J.M.; Hernandez, J.C.; Ribagorda, A.; Jayaram, N.; Security Technology, 2002. Proceedings. 36th Annual 2002 International Carnahan Conference on Oct. 20-24, 2002 pp. 134-143.*
RSVP over IPsec tunnel mode using RFC 3175 Griem, T.; Ayyagari, A.; Kim, J.H.; Military Communications Conference, 2005. MILCOM 2005. IEEE Oct. 17-20, 2005 pp. 3246-3250 vol. 5.*
PCT-International Search Report dated Sep. 4, 2002, for Application No. PCT/US01/43066, filed Nov. 13, 2001.

* cited by examiner

*Primary Examiner*—David Jung
(74) *Attorney, Agent, or Firm*—Arent Fox LLP

(57) ABSTRACT

A system and method are provided for use in maintaining secure communications between a home network and a mobile client when the client roams outside of the home network to a new location. One method of the present invention includes the steps of: establishing a new IP address for the new client location; sending a registration message identifying the new IP address location; authenticating the registration message; encapsulating and transmitting the registration message to the home server; registering the new IP address as a care-of-address for the client at the home server; confirming the registration of the new IP address with the client; establishing a security association between the home server and the relay server on behalf of the client; performing network address translation between the client's permanent IP address client and the client's new IP address; tunneling packets addressed for the client between the home server based and the relay server based on the established security association and the address translation for the client; and decapsulating the packets at the relay server and forwarding the packets to the client.

15 Claims, 7 Drawing Sheets

SYSTEM AND METHOD FOR SECURE NETWORK MOBILITY

CLAIM TO BENEFIT OF PROVISIONAL APPLICATION

This application claims the benefit of U.S. Provisional Application No. 60/247,008 filed Nov. 13, 2000.

FIELD OF INVENTION

The present invention generally relates to a system and method for enhancing computer network mobility. More specifically, the present invention relates to a system and method for providing secure, Internet Protocol (IP) mobility.

BACKGROUND OF THE INVENTION

The current standard for Mobile IP allows a mobile user to maintain connections as the user roams through the Internet, and allows mobile users to be reached under the same IP address. Accordingly, the current system for Mobile IP facilitates bi-directional communication, and supports mobile servers (or routers or other network resources).

Mobile IP is an open Internet standard and is specified mainly in ITEF-RFC 2002 which is hereby incorporated by reference. The fundamental premise of Mobile IP is that a mobile user can maintain the same network address regardless of where he roams. This ability is fundamentally important and desirable for two reasons: (1) connections can be maintained while roaming from one network to another and (2) bi-directional communications become possible. Connections can be maintained for IP-based communications protocols such as User Datagram Protocol (UDP) and Transmission Control Protocol (TCP). For these protocols, connections are identified by four parameters, namely source and destination IP addresses and source and destination port numbers. Without Mobile IP, roaming requires a change in the mobile user's IP address which in turn leads to a loss of all connections established under the previous IP address. Hence, Mobile IP's ability to maintain the same IP address allows for "seamless" roaming in the sense that connections can be maintained while roaming. Another benefit from maintaining a single IP address is true bi-directional communications. That means, connections can be established with roaming mobile devices (hereafter referred to as a "clients") as the destination. This ability is crucial for interactive applications (like MS NetMeeting, CUSeeMe, PowWow, and others). It also paves the way for mobile information servers. It is important to realize that these benefits apply to all IP based applications. From the application, and thus the user, the perspective is that of only a single, permanent IP address that identifies each client (i.e. laptop, handheld, smart-phone) regardless of its location.

Mobile IP works by employing two IP addresses: a permanent IP address is visible to applications and the user, while a second temporary or care-of address is used to ensure proper routing. Accordingly, when a party is traveling away from their home network, their client establishes a new IP address and this new IP address is forwarded back to their home network as a forwarding address for all message traffic addressed to the original, permanent IP address. Accordingly, the mobile user has their packets routed to them as if they were still connected to their home network terminal. In operation, Mobile IP software arbitrates between the two addresses and hides mobility from applications and the user.

In most applications, Mobile IP operates through software resident on the mobile user's home network. This software (sometimes referred to as an "agent") intercepts packets arriving for departed clients and forwards them to the clients at their care-of addresses. In some cases, Mobile IP includes the use of Mobile IP software resident on various subnets visited by the roaming clients (termed "Foreign Agents"). In many cases, the use of Foreign Agents are not strictly required since its functionality may be subsumed into the clients themselves. A client operating without a Foreign Agent is said to be in co-located mode.

The strength of the Mobile IP protocol clearly is that it enables seamless roaming and bi-directional communications. From a practical perspective, however, Mobile IP by itself is inadequate. Most importantly, Mobile IP has been designed for an open Internet. Security has scarcely been considered in its specification. In practice, a mobile user's communications must be protected against eavesdropping and tampering.

In addition to providing no security for its own networks, as presently configured and practiced, Mobile IP networks do not provide any practical means for securely accessing protected corporate networks with which it communicates. In particular, the Mobile IP protocol will not work through such devices as firewalls or VPN gateways which are increasingly common.

SUMMARY OF THE INVENTION

According to the present invention there is provided a system and method for secure IP mobility which allows roaming users to securely access their home networks.

An additional advantage of the present invention is the provision of a system for advanced IP mobility which provides secure Internet communications from any location and at any time.

Another advantage of the present invention is the provision of a system for advanced IP mobility which provides bi-directional communications.

Still another advantage of the present invention is the provision of a system for advanced IP mobility which does not burden the user with respect to management of network interfaces.

Additional objects and advantages of the present invention will be set forth in part in the description which follows, and in part will be obvious from the description, or may be learned by practice of the invention. The objects and advantages of the invention may be realized and attained by means of instrumentalities and combinations, particularly pointed out in the appended claims.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein.

DETAILED DESCRIPTION OF THE PREFERRED EMBODIMENT

Figure 1:
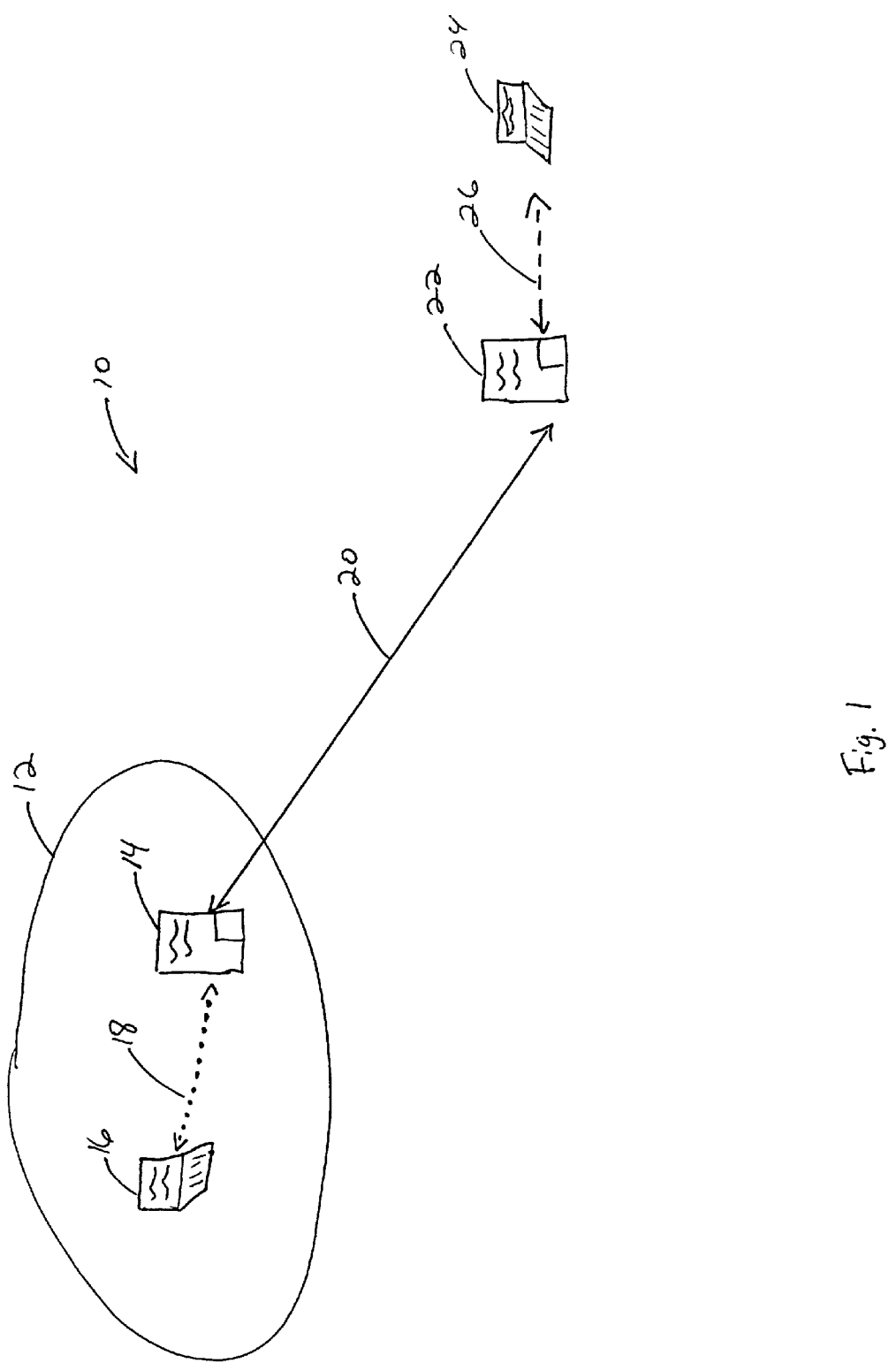
FIG. 1 is a simplified schematic representation illustrating one example of a computer network configuration for use with one embodiment of the present invention.

Reference will now be made in detail to the present preferred embodiment of the invention, an example of which is illustrated in the accompanying drawings in which like reference characters refer to corresponding elements. Preferably, the system and method of the present invention described below, may be implemented by an interactive computer software application incorporated within a computer-readable medium such as a hard disk drive, an optical medium such as a compact disk, or the like. Further, the computer-readable medium may be available to a user either locally on the user's computer or remotely over a computer network, such as a local area network (LAN) or through the Internet.

The present invention is designed to provide mobile professionals with unparalleled networking support and security. This entails that mobility becomes transparent to users of the present invention. Accordingly, as the user of the present invention roams away from his office and the network provided there, he can continue to communicate without interruption and without the need to reconfigure his enabled device or client (i.e. laptop, handheld, smart-phone). The present invention provides a comprehensive solution to protect cryptographically information exchanged by mobile users as soon as they leave the protection of their corporate network. Additionally, the present invention provides multiple means of gaining access to resources on the protected corporate network.

A unique and important feature provided by the present invention is the ability to maintain the same network (IP) address as on the corporate network. This makes the present invention the only solution to allow mobile users to receive connections. This ability is crucial in interactive, peer-to-peer applications (like MS NetMeeting) when the mobile user is the recipient of a "call."

FIG. 1 illustrates an example network arrangement 10 employing a system and method of the present invention in accordance with a preferred embodiment of the invention. It should be understood that the present invention operates independent of any particular arrangement or mix of network components and that network 10 depicted in FIG. 1 is purely illustrative and simplified for the purpose of explanation.

As shown in FIG. 1, exemplary network arrangement 10 is comprised of a home network 12 which includes a home network server 14 and a client 16 located within the home network 12. As shown in FIG. 1, when operating in its home network 12, the client 16 may be linked directly to the home server 14 via LAN or similar connection 18. As further shown in FIG. 1, when a client 24 roams outside of its home network 12, the client 24 may still gain access to its home server 14 via encrypted link 26, relay server 22 and encrypted tunnel 20 as described in detail below with reference to FIG. 3.

Figure 3:
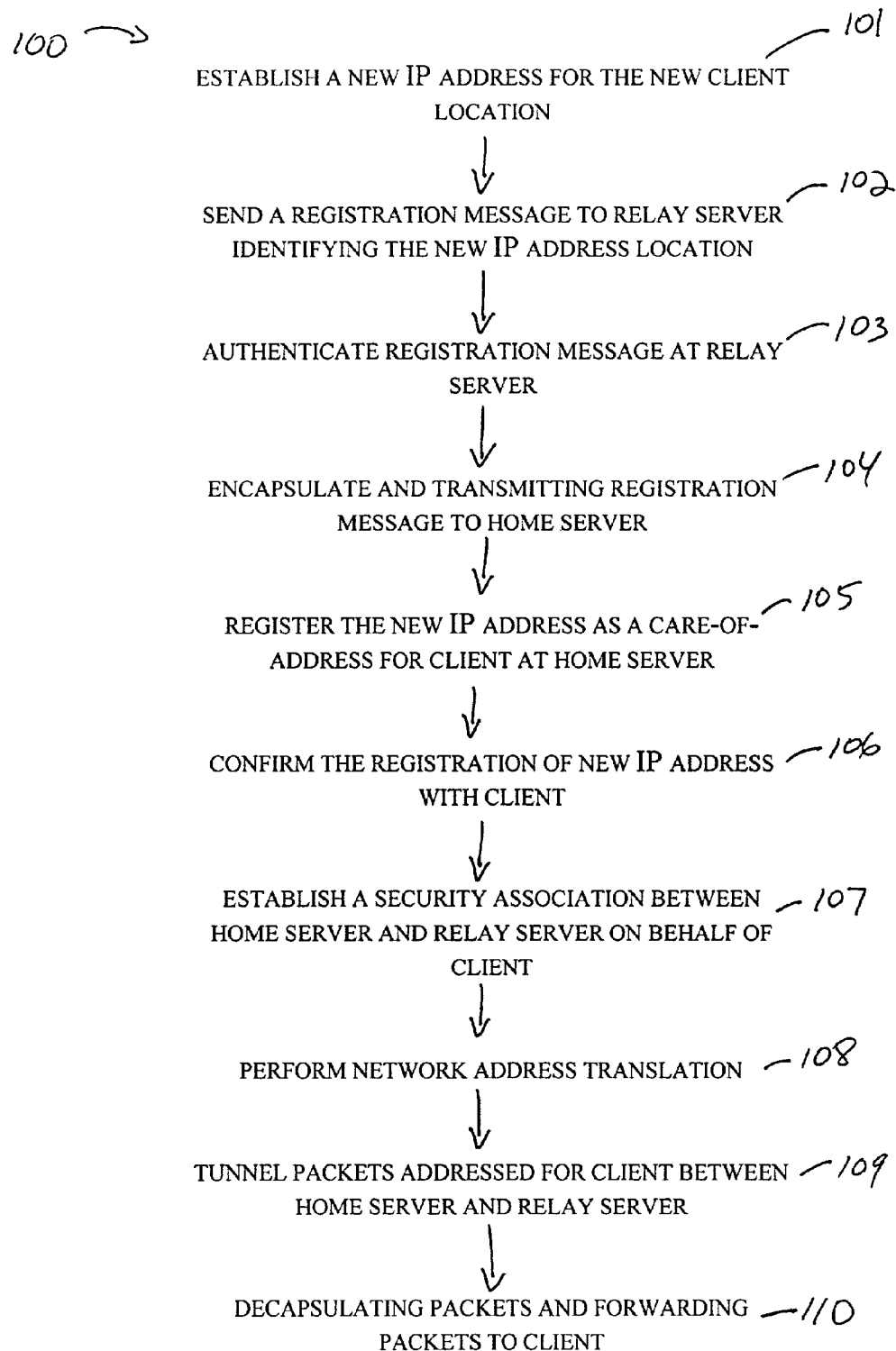
FIG. 3 is a simplified flowchart of a method for providing secure network communications in accordance with one embodiment of the present invention.

FIG. 3 shows a block diagram 100 illustrating operation of the present invention. At step 100, a roaming client 24 establishes a new IP address for its new location outside of its home network 12. At step 102, client 24 sends a message identifying and registering its new address to a relay server 102 which may include a Foreign Agent for communicating with home server 14. At step 103, the relay server 22 authenticates the client's 24 message to ensure the identity of the client 24. At step 104, relay server 22 encapsulates the registration message from the client 24 and transmits the encapsulated message to the home server 14. At step 105, the home server 14 registers the new IP address as a care-of-address for the client 24. At step 106, the home server 14 transmits a reply message to the client confirming the registration of said new IP address. At step 107, the home server 14 and relay server 22 establish a security association on behalf of said client as detailed below. At step 108, the home server 14 begins performing network address translation between the client's 24 permanent IP address and the client's 24 new IP address for traffic addressed for the client 24. At step 109, the home server 14 and relay server 22 establish an encrypted tunnel 20 and begin encapsulating and tunneling packets addressed for the client 24 from the home server 14 to the relay server 22 based on the established security association and the address translation for the client 24. At step 110, relay server 22 decapsulates the tunneled packets and forwards them to the client via link 26 which may be an encrypted.

Figure 2:
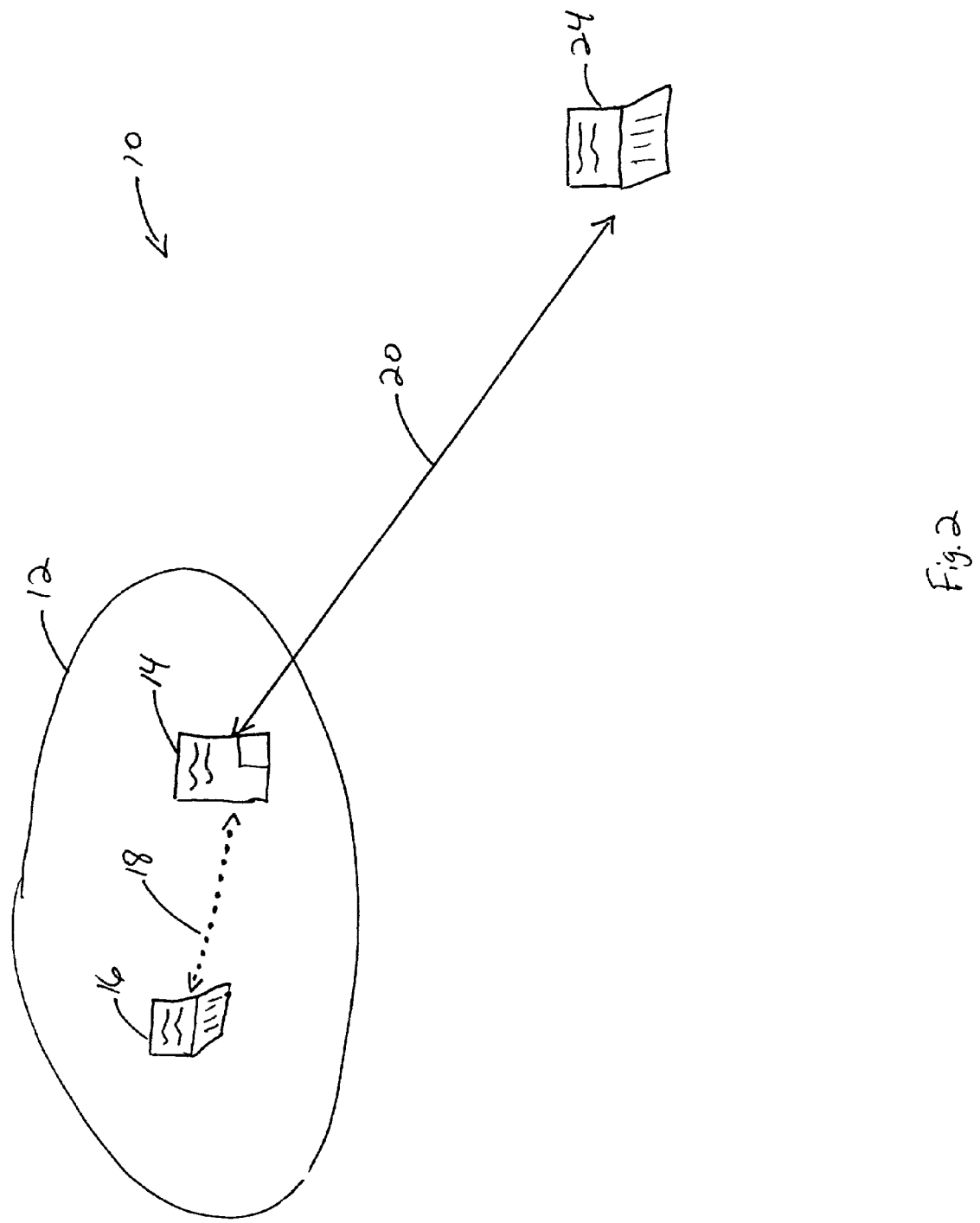
FIG. 2 is a simplified schematic representation illustrating another example of a computer network configuration for use with a second embodiment of the present invention.

With reference to FIG. 2, when a relay server 22 is unavailable or deemed unreliable for security reasons, the client 24 may operate in a co-located mode. In this mode, all the functions performed by the relay server 22 are performed by the client 24 itself. Accordingly, in the co-located mode illustrated in FIG. 2, the client 24 may communicate directly with its home server 14 to register its new IP address (steps 102 and 103), encapsulate and transmit its registration (steps 104, 105, and 106), establish a security association and an encrypted tunnel 20 with its home server 14 (steps 107, and 109), and decapsulate received packets (step 110). In accordance with the present invention, when operating in co-located mode, the client 24 itself must acquire a topologically correct, temporary network address. In accordance with a preferred embodiment of the present invention, the client 24 may use multiple means to obtain such an address. For instance, the client 24 may use PPP (for dial-up connections), DHCP (for LANs without foreign agents), and even manual configuration of a valid care-of address. After a care-of address is obtained by the client 24, the operation of the present invention is exactly as described above.

In accordance with a preferred embodiment of the present invention, all data sent between the client 24, the home server 14 and the relay server 22 is preferably encrypted and authenticated using the IPSec ESP protocol. Alternatively, however, a variety of encryption methods and algorithms may be used including, for instance, PKI, RSA, DSA, DES, 3DES, and IKE protocols.

Further, in accordance with a preferred embodiment of the present invention, the establishment of secure connections, so called security associations, is preferably performed according to the Internet Key Exchange (IKE) protocol. Additionally, the present invention supports both shared secrets and digital certificates (distributed via PKI) during the negotiation of security associations. Preferably, PKI configuration (e.g., selection of cryptographic algorithm)

and administration (e.g., distribution of shared secrets or certificate management) is performed by the home server 14 the present invention.

IKE requires two distinct phases in the establishment of security associations. The first phase serves two purposes. First, the negotiating parties authenticate each other and, second, they negotiate an intermediate security association to protect the second phase. In accordance with a preferred embodiment of the present invention, Public Key Infrastructure (PKI) digital certificates are preferably used during IKE negotiations.

In cases where a client 24 roams into a network protected by a firewall and/or an IPSec (VPN) Gateway (collectively referred to as "perimeter defense systems"), additional aspects of the present invention are required to freely exchange packets between the client 24 and its home network server 14. In accordance with a preferred embodiment of the present invention, three different methods for the secure traversal of a network perimeter defense systems are provided. In short, these methods are: (a) traffic encapsulation in an authenticated HTTP tunnel, (b) authenticated firewall traversal via a surrogate home agent or proxy server located on the public side of the firewall, and (c) secure, IPSec-based traversal of a VPN Gateway. With reference now to FIGS. 4–7, each method will now be discussed.

Figure 4:
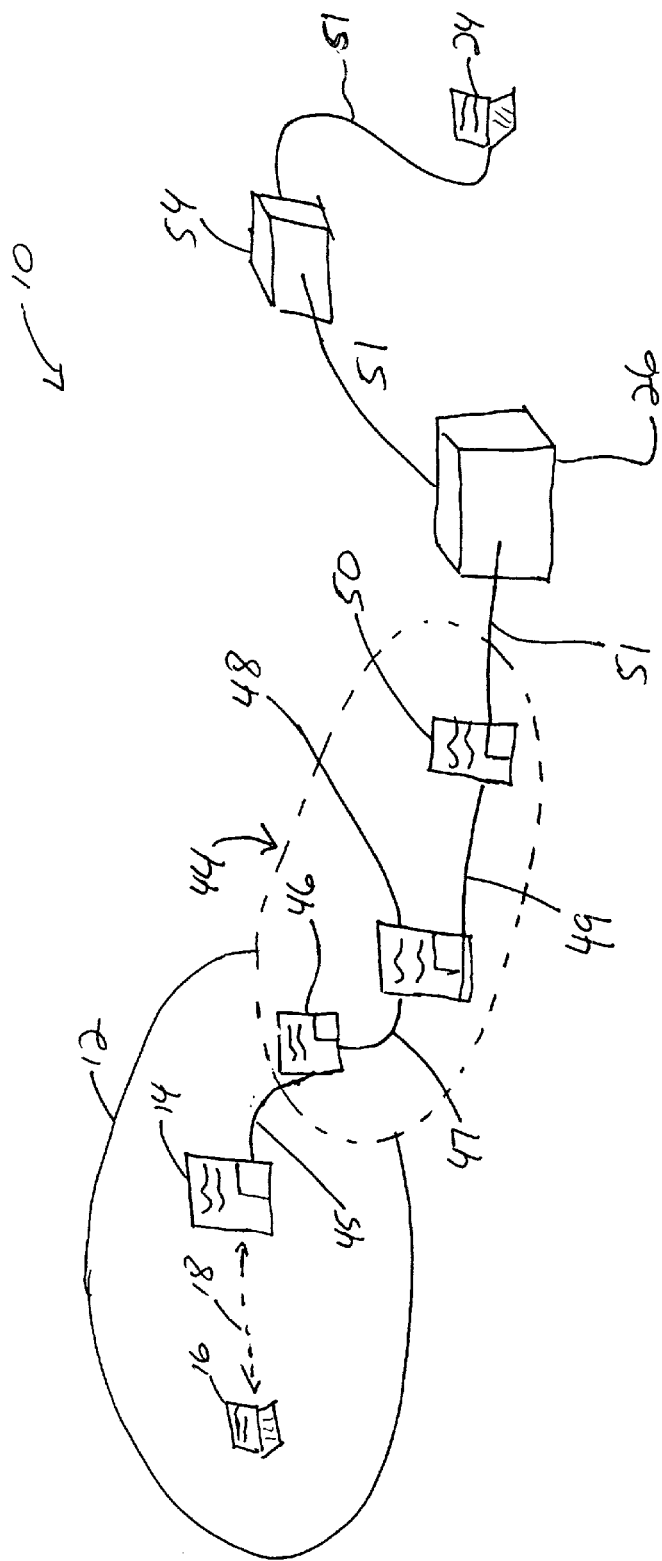
FIG. 4 illustrates a simplified network arrangement for the secure traversal of firewalls using authenticated HTTP tunneling.
Figure 5:
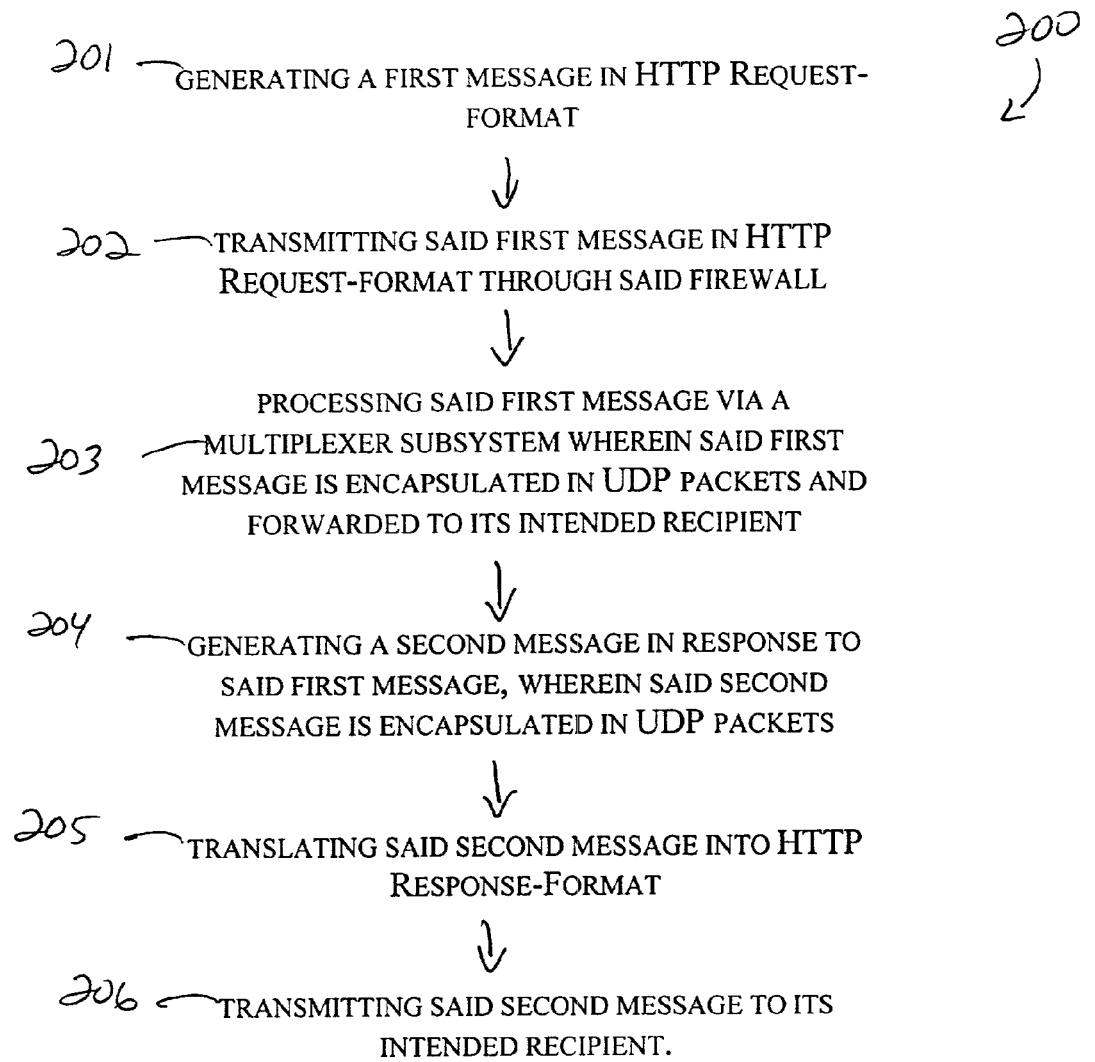
FIG. 5 is a flow chart of a method for the secure traversal of firewalls in accordance with a preferred embodiment of the present invention.

FIG. 4 is a block diagram of a computer network arrangement 10 utilizing a first method for secure traversal of a network perimeter defense according to the present invention. FIG. 5 shows a flow diagram 200 illustrating operation of the present invention. At step 201, the roaming client 24 generates a message in HTTP Request-format. For the purposes of the present invention, HTTPS Response and Request Formats are considered one just one type of HTTP Response and Request Formats.

In accordance with a preferred embodiment of the present invention, the HTTP Request-format messages are is preferably encrypted, packetized and encapsulated for tunneling. At step 202, the client 24 transmits this message in HTTP Request-format to its home server 14 through any intervening firewalls 54, 26 via HTTP link 51.

In accordance with the present invention, since the HTTP Request-format traffic from the client 24 appears to the firewall a public internet traffic, it will successfully traverse this first firewall 54 and ultimately arrive at the home network firewall 26. In accordance with a preferred embodiment of the present invention, HTTP Request-format traffic from the client 24 is first authenticated by the home network firewall 26 using an authentication protocol such as the SOCKS protocol or the like. Alternatively, firewall 26 may be configured to allow HTTP Request-format traffic to pass with lesser or greater degrees of authentication.

In step 203, once the HTTP Request-format message traffic is forwarded through the network firewall 26, it is processes by multiplexer subsystem 44 where the message traffic is encapsulated in UDP packets for forwarding to home server 14 via UDP link 45. As shown in FIG. 4, in accordance with a preferred embodiment of the present invention, the multiplexer subsystem 44 of the present invention may include an HTTP client server 50 and a multiplexer 46. Additionally, the multiplexer subsystem 44 may further include a Fast CGI module 48 or other components as desired to increase network efficiency and speed.

Within the multiplexer subsystem 44, as shown in FIG. 4, the HTTP server 50 preferably receives the message traffic from the home network firewall 26 via HTTP link 51. Once received, the HTTP server 50 then routes the message traffic for further processing and routing. In accordance with a preferred embodiment of the present invention, the HTTP server 50 preferably routes the message traffic to a Fast CGI module 48 which then forwards the message traffic to multiplexer 46 via TCP link 47. From the multiplexer 46, the messages are parsed into UDP packets and forwarded to the home server 14 via UDP link 45.

At step 204, the home server 14 may respond to the client 24 by generating a reply which is encapsulated in UDP packets. At step 205, the encapsulated response is translated into HTTP Response-Format. As shown in FIG. 4, the encapsulated response may be translated into HTTP Response-Format via multiplexer subsystem 44 as described above. In step 206, the encapsulated response is then forwarded to its intended recipient as a HTTP Response-Format message traffic. In accordance with a preferred embodiment of the present invention, each HTTP link 51 may include strong authentication to create secure HTTP tunnels. Preferably, SOCKS protocol authentication or the like is provided within each firewall and Secure Socket Layer (SSL) or the like authentication is used within selected web and HTTP servers.

Figure 6:
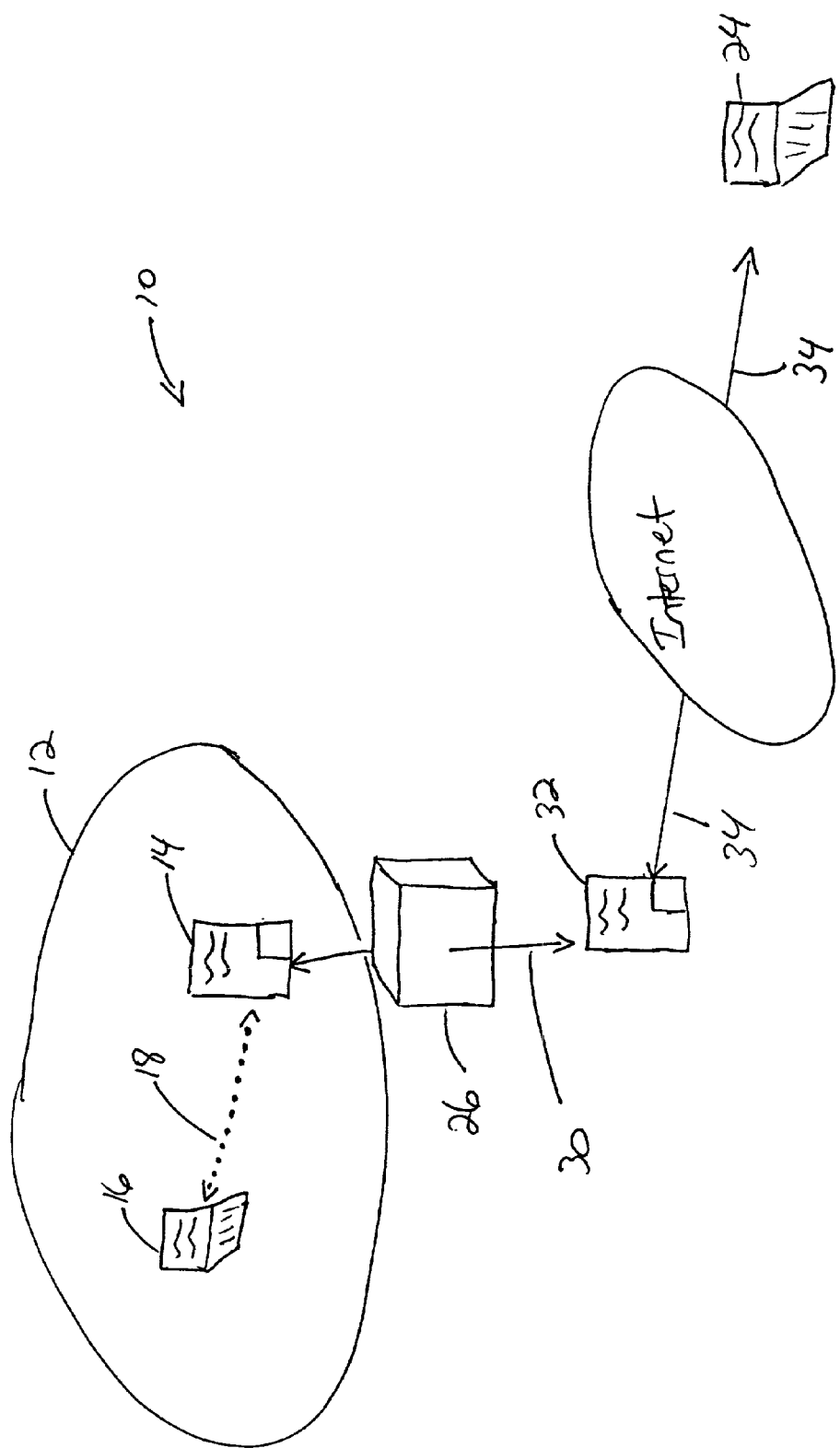
FIG. 6 illustrates a simplified network arrangement for the secure traversal of firewalls and VPN gateways using a relay or proxy server.

With reference now to FIG. 6, an alternative firewall transversal method is illustrated for use as part of the present invention. As shown in FIG. 6, in accordance with a preferred embodiment of the present invention, the HTTP Request-format traffic from the client 24 (shown in "co-located" mode) may be forwarded to home server 14 via a proxy or "relay" server 32. In accordance with the present invention, the relay server 32 may authenticate registration messages sent by the client 24 in the same way the home network 12 would as described above. Accordingly, the relay server 32 may receive registration messages from a client 24 and, if authentication is successful, the relay server 32 may encapsulate and forward messages through the firewall 26 to the home network server 14 via link 30. Thereafter, in accordance with the present invention, the home network server 14 may process the registration message and formulate a response which is then encapsulated and sent to the relay server 32. Accordingly, if the response indicates a successful registration, the relay server 26 server may begin relaying tunneled packets between the client 24 and home server 24 via encrypted links 30 and 34. In accordance with a preferred embodiment of the present invention, the relay server 32 itself performs network address translation on packets addressed to and from the client 24. Further in accordance with a preferred embodiment of the present invention, immediately after registration, the client 24 may initiate an IKE negotiation to set up a security association with the home network 32.

With respect to packets transmitted between the proxy server 32 and the home server 14, in accordance with a preferred embodiment of the present invention, preferably these are encapsulated using standard protocol type 4 encapsulation (IP-in-IP encapsulation). According to the present invention, this allows for very tight filtering at the firewall, using both IP addresses, the protocol number, and possibly even hardware addresses. Consequently, the integrity of the firewall is not compromised even if the relay server were ever compromised. In an alternative embodiment, the relay server 32 may be incorporated into the firewall itself.

Figure 7:
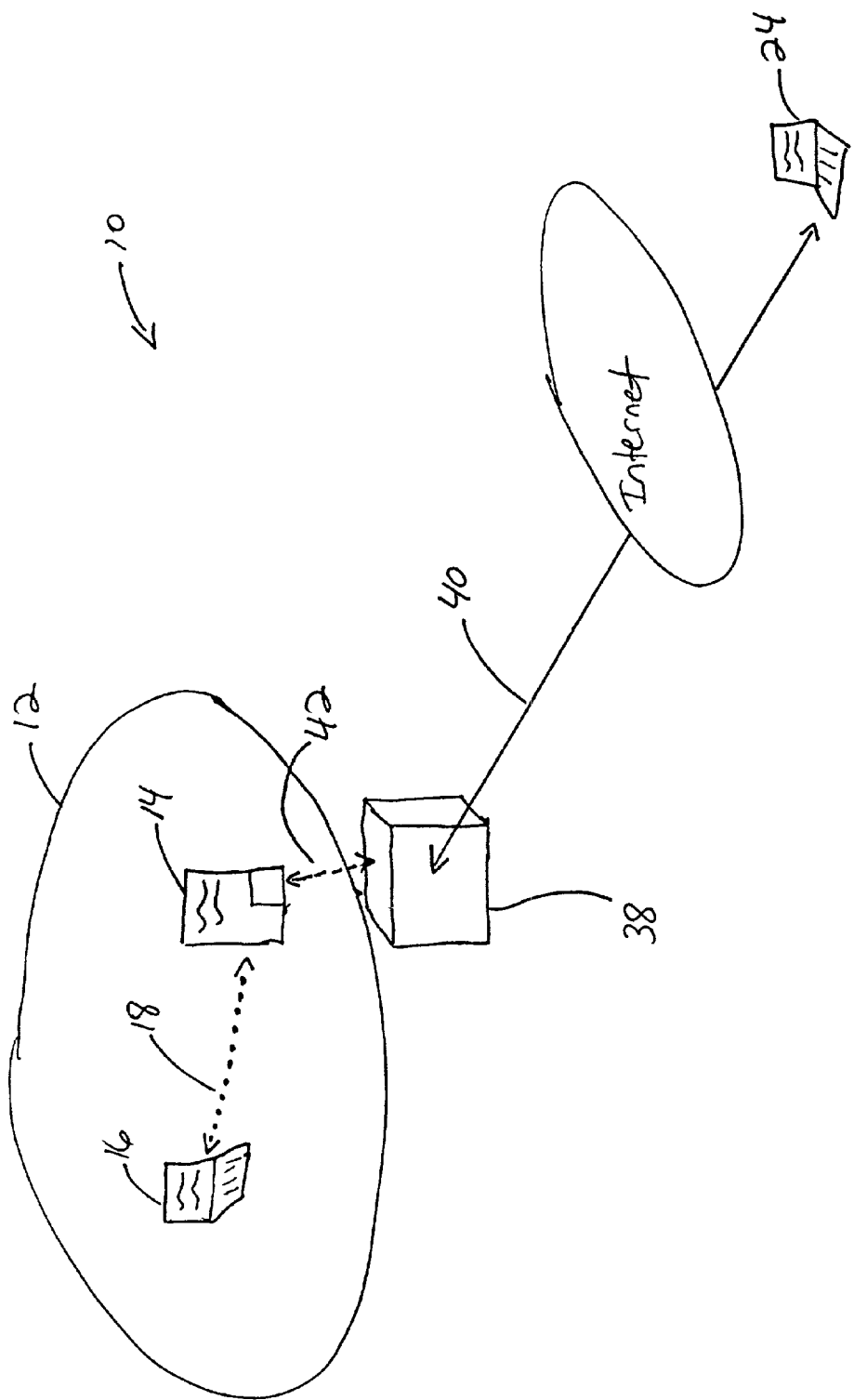
FIG. 7 illustrates a simplified network arrangement for the secure traversal of firewalls using an IPSec Gateway.

With reference now to FIG. 7, a further alternative embodiment of the present invention is provided. As shown in FIG. 7, an IPSec Gateway 38 may be incorporated as part of the network arrangement 10 to secure the perimeter of home network 12. As shown, with the use of a IPSec gateway 38 or similar device, the client 24 of the present may establish an IPSec tunnel 40 directly between itself and the IPSec, Gateway 38. The IPSec tunnel 40 is preferably configured to allow the IPSec gateway 38 to authenticate packets from the client 24 before allowing them to pass to the inside of the network 12 via encrypted link 42. Additionally, in accordance with a preferred embodiment of the present invention, the IPSec gateway 38 may be configured to incorporate the same functions of the relay sever 22 described above.

According to a preferred embodiment of the present invention, the IPSec gateway 38 may be a VPN gateway or similar device. Further in accordance with a preferred embodiment of the present invention, IPSec ESP or AH protocol may be used for authenticating packets.

As is readily apparent from the above detailed description, the system and method of the present invention may be used in a variety of network configurations in which network security and mobility are desirable. The system and method of the invention are also highly flexible and can be easily modified and customized to fit specific situations. For instance, the present invention may be used within network arrangements such as a local area network (LAN), including an Ethernet and a Token Ring access methods, a wireless local area network (WLAN), a metropolitan area network (MAN), a virtual local area network (VLAN), a wide area network (WAN), and a Bluetooth network. Additionally, the present invention may work within wireless data networks such as GPRS, NTT DoCoMo, Hot Spots, GSM-Data, CDMA-One and HS-CDS networks, and wired public networks such as POTS, DSL, Cable and ISDN networks.

Further, although the preferred embodiments are discussed without reference to a particular operating environment, the present invention may be used in a variety of server platforms and operating environments such as, for example, Windows NT, Me, XP, 95, 98 and 2000, as well as Unix, OS/2, Pocket PC and NetWare.

Additionally, the present invention may be used with a variety of networking links and protocols including those based upon, for example, a Network File System (NFS); a Web NFS; a Server Message Block (SMB); a Samba; a Netware Core Protocol (NCP); a Distributed File System (DFS), and a Common Internet File System (CIFS) architecture, as well as use such transport protocols as, for example, TCP/IP, IPX/SPX, HTTP, HTTPS and NetBEUI.

The invention has been described with particular reference to preferred embodiments which are intended to be illustrative rather than restrictive. Alternative embodiments will become apparent to those skilled in the art to which this invention pertains without departing from its spirit and scope. Thus, such variations and modifications of the present invention can be effected within the spirit and scope of the following claims.

What is claimed is:

1. A method of establishing and maintaining secure communications between a home network server that is associated with a home network and a client when the client roams from the home network to a new location outside of the home network, the method comprising:

at the client, establishing a new Internet Protocol address associated with the new location, wherein the client has a permanent Internet Protocol address associated with the home network;

at the client, transmitting a registration message, to a relay server that is coupled to the home network server, wherein the registration message identifies the new Internet Protocol address associated with the permanent Internet Protocol address;

at the relay server, authenticating the registration message;

at the relay server, encapsulating the registration message;

at the relay server, transmitting the encapsulated registration message to the home network server;

establishing a security association between the home network server and the relay server;

at the home network server, registering the new Internet Protocol address as a care-of-address for the client;

at the home network server, transmitting a reply message to the client confirming registration of the new Internet Protocol address as the care-of address for the client, thereby establishing a tunnel between the home network server and the client via the relay;

establishing a security association between the home network server and the client inside the tunnel;

at the home network server, performing network address translation between the permanent IP address and the new Internet Protocol address for packets addressed to the client; and at the home network server, encapsulating the packets that are addressed to the client based on the security association between the home network server and the client, wherein establishing the security association between the home network server and the relay server comprises:

at the relay server, authenticating the home network server;

at the home network server, authenticating the relay server;

establishing a secure channel for negotiations between the relay server and the home network server; and using the secure channel, negotiating security parameters to establish the security association between the relay server and the home network server, wherein the security parameters comprise an encryption method, an integrity method, and a lifetime of the security association.

2. The method of claim 1, wherein the home network comprises a firewall proxy.

3. The method of claim 1, further comprising:

for traffic between the client and the home network server, tunneling the encapsulated packets is based on the security association between the home network server and the client.

4. The method of claim 3, wherein establishing the security association between the home network server and the client comprises:

at the client, authenticating the home network server;

at the home network server, authenticating the client;

establishing a secure channel for negotiations between the client and the home network server; and using the secure channel, negotiating security parameters to establish the security association between the client and the home network server, wherein the security parameters comprise an encryption method, an integrity method, and a lifetime of the security association.

5. The method of claim 3, wherein the tunneling of the encapsulated packets comprises:

for outbound traffic, at the relay server, decapsulating the encapsulated packets;

at the relay server, encapsulating the decapsulated packets using the client's new Internet Protocol address; and at the relay server, transmitting the encapsulated decapsulated packets to the client; and for inbound traffic, at the relay server, decapsulating the encapsulated packets;

at the relay server, encapsulating the decapsulated packets using the home network server Internet Protocol address; and at the relay server, transmitting the encapsulated decapsulated packets to the home network server.

6. The method of claim 1, wherein the tunnel between the home network server and the relay is an encrypted tunnel.

7. The method of claim 1, wherein the tunnel between the home network server and the client is an encrypted tunnel.

8. A method of establishing and maintaining secure communications between a home network server that is associated with a home network and a client when the client roams from the home network to a new location outside of the home network, the method comprising:

at the client, establishing a new Internet Protocol address associated with the new location, wherein the client has a permanent Internet Protocol address associated with the home network;

at the client, transmitting a registration message to the home server, wherein the registration message identifies the new Internet Protocol address associated with the permanent Internet Protocol address;

at the home network server, authenticating the registration message;

at the home network server, registering the new Internet Protocol address as a care-of-address for the client;

at the home network server, transmitting a reply message to the client confirming registration of the new Internet Protocol address as the care-of address for the client, thereby establishing a tunnel between the home network server and the client;

establishing a security association between the home network server and the client via the tunnel;

at the home network server, encapsulating the packets that are addressed to the client based on the security association between the home network server and the client;

for outbound traffic to the client, at the home network server, encapsulating the rackets addressed to the client;

tunneling the encapsulated packets to the client, based on the security association between the home network server and the client, and the client's new Internet Protocol address;

at the client, decapsulating the encapsulated packets;

for inbound traffic to the home network server, at the client, encapsulating the packets addressed to the home network server;

tunneling the encapsulated packets to the home network server, based on the security association between the client and the home network server; and at the home network server, decapsulating the encapsulated packets, wherein establishing the security association between the home network server and the client comprises:

at the client, authenticating the home network server;

at the home network server, authenticating the client;

establishing a secure channel for negotiations between the client and the home network server; and using the secure channel, negotiating security parameters to establish the security association between the client and the home network server, wherein the security parameters comprise an encryption method, an integrity method, and a lifetime of the security association.

9. The method of claim 8, wherein the home network comprises a firewall proxy.

10. A method of establishing and maintaining secure communications between a home network server that is associated with a home network and a client when the client roams from the home network to a new location outside of the home network, the method comprising:

at the client, establishing a new Internet Protocol address associated with the new location, wherein the client has a permanent Internet Protocol address associated with the home network, and the home network comprises a firewall;

at the client, transmitting a registration message in HTTP Reguest-Format to a relay server that is coupled to each of the client and the home network server, wherein the registration message identifies the new Internet Protocol address, and the relay server is located on a public side of the firewall;

at the relay server, authenticating the registration message;

at the relay server, encapsulating the registration message in at least one first user datagram protocol packet;

establishing a security association between the home network server and the relay server;

at the relay server, transmitting the at least one first user datagram protocol packet through the firewall to the home network server;

at the home network server, registering the new Internet Protocol address as a care-of-address for the client;

at the home network server, generating a reply message and encapsulating the reply message in at least one second user datagram protocol packet, wherein the reply message confirms registration of the new Internet Protocol address as the care-of address for the client;

at the home network server, transmitting the at least one second user datagram protocol packet to the relay server;

at the relay server, translating the at least one second user datagram protocol packet into HTTP Response-Format to generate a translated reply message;

at the relay server, upon a request from the client, transmitting the translated reply message to the client;

at the home network server, performing network address translation between the permanent Internet Protocol address and the new Internet Protocol address for packets addressed to the client;

at the home network server, encapsulating the packets that are addressed to the client;

at the home network server, tunneling the encapsulated packets to the relay server based on the security association between the home network server and the relay server, and the network address translation between the permanent Internet Protocol address and the new Internet Protocol address;

at the relay server, decapsulating the encapsulated packets; and at the relay server, transmitting the decapsulated packets to the client, wherein establishing the security association between the home network server and the relay server comprises:

at the relay server, authenticating the home network server;

at the home network server, authenticating the relay server;

establishing a secure channel for negotiations between the relay server and the home network server; and using the secure channel, negotiating security parameters to establish the security association between the relay server and the home network server, wherein the security parameters comprise an encryption method, an integrity method, and a lifetime of the security association.

11. A method of establishing and maintaining secure communications between a home network server that is associated with a home network and a client when the client roams from the home network to a new location outside of the home network, the method comprising:
   at the client, establishing a new Internet Protocol address associated with the new location, wherein the client has a permanent Internet Protocol address associated with the home network, and the home network comprises a firewall;
   at the client, transmitting a registration message in HTTP Reguest-Format to a relay server that is coupled to each of the client and the home network server, wherein the registration message Identifies the new Internet Protocol address, and the relay server is located on a public side of the firewall;
   at the relay server, authenticating the registration message;
   at the relay server, encapsulating the registration message in at least one first user datagram protocol packet;
   establishing a security association between the home network server and the relay server;
   at the relay server, transmitting the at least one first user datagram protocol packet through the firewall to the home network server;
   at the home network server, registering the new Internet Protocol address as a care-of-address for the client;
   at the home network server, generating a reply message and encapsulating the reply message in at least one second user datagram protocol packet, wherein the reply message confirms registration of the new Internet Protocol address as the care-of address for the client;
   at the home network server, transmitting the at least one second user datagram protocol packet to the relay server;
   at the relay server, translating the at least one second user datagram protocol packet into HTTP Response-Format to generate a translated reply message;
   at the relay server, upon a request from the client, transmitting the translated reply message to the client;
   at the home network server, performing network address translation between the permanent Internet Protocol address and the new Internet Protocol address for packets addressed to the client;
   at the home network server, encapsulating the packets that are addressed to the client;
   at the home network server, tunneling the encapsulated packets to the relay server based on the security association between the home network server and the relay server, and the network address translation between the permanent Internet Protocol address and the new Internet Protocol address;
   at the relay server, decapsulating the encapsulated packets; and
   at the relay server, transmitting the decapsulated packets to the client,
   wherein establishing the security association between the home network server and the client comprises:
   at the client, authenticating the home network server;
   at the home network server, authenticating the client;
   establishing a secure channel for negotiations between the client and the home network server; and
   using the secure channel, negotiating security parameters to establish the security association between the client and the home network server, wherein the security parameters comprise an encryption method, an integrity method, and a lifetime of the security association.

12. The method of claim 11, wherein the tunnel between the home network and the client is an encrypted tunnel.

13. A method of establishing and maintaining secure communications between a home network server that is associated with a home network and a client when the client roams from the home network to a new location outside of the home network, comprising:
   at the client, establishing a new Internet Protocol address associated with the new location, wherein the client has a permanent Internet Protocol address associated with the home network, and the home network comprises a firewall and a multiplexer system;
   at the client, transmitting a registration message in HTTP Reguest-Format to the firewall, wherein the registration message identifies the new Internet-Protocol address;
   at the firewall, authenticating the registration message;
   at the firewall, transmitting the registration message to the multiplexer system;
   at the multiplexer system, encapsulating the registration message in at least one first user datagram protocol packet;
   at the multiplexer system, transmitting the at least one first user datagram protocol packet to the home network server;
   at the home network server, registering the new Internet Protocol address as a care-of-address for the client;
   at the home network server, generating a reply message and encapsulating the reply message in at least one second user datagram protocol packet, wherein the reply message confirms registration of the new Internet Protocol address as the care-of address for the client;
   at the home network server, transmitting the at least one second user datagram protocol packet to the multiplexer system;
   at the multiplexer system, translating the at least one second user datagram protocol packet into HTTP Response-Format to generate a translated reply message;
   at the multiplexer system, transmitting the translated reply message to the client;
   establishing a security association between the home network server and the client;
   establishing an encrypted tunnel between the home network server and the client;
   at the home network server, performing network address translation between the permanent IP address and the new Internet Protocol address for packets addressed to the client;
   at the home network server, encapsulating the packets that are addressed to the client;
   at the home network server, tunneling the encapsulated packets to the client based on each of the security association between the home network server and the client and the network address translation between the permanent Internet Protocol address and the new Internet Protocol address; and
   at the client, decapsulating the encapsulated packets,
   wherein establishing the security association between the home network server and the client comprises:
   at the client, authenticating the home network server;
   at the home network server, authenticating the client;
   establishing a secure channel for negotiations between the client and the home network server; and using the secure channel, negotiating security parameters to establish the security association between the client and the home network server, wherein the security parameters comprise an encryption method, an integrity method, and a lifetime of the security association.

14. The method of claim 13, further comprising:
for further outbound traffic to the client, at the home network server, encapsulating the packets addressed to the client;
   tunneling the encapsulated packets to the client via the multiplexer system, based on the security association between the home network server and the client; and
   at the client, decapsulating the encapsulated packets; and for further inbound traffic to the home network server, at the client, encapsulating the packets addressed to the home network server;
   tunneling the encapsulated packets to the home network server via the multiplexer, based on the security association between the client and the home network server; and
   at the home network server, decapsulating the encapsulated packets.

15. The method of claim 13, wherein the tunnel between the home network and the client is an encrypted tunnel.

* * * * *